(12) United States Patent
Cho

(10) Patent No.: US 8,942,017 B2
(45) Date of Patent: Jan. 27, 2015

(54) ENERGY STORAGE SYSTEM AND METHOD THEREOF

(71) Applicant: Samsung SDI Co., Ltd., Yongin-si (KR)

(72) Inventor: Sungchun Cho, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 126 days.

(21) Appl. No.: 13/834,651

(22) Filed: Mar. 15, 2013

(65) Prior Publication Data

US 2014/0139200 A1   May 22, 2014

(30) Foreign Application Priority Data

Nov. 22, 2012   (KR) .................. 10-2012-0133284

(51) Int. Cl.
*H02M 3/156* (2006.01)
(52) U.S. Cl.
CPC ............... *H02M 3/156* (2013.01); *Y02E 10/76* (2013.01)
USPC .......................................................... 363/95
(58) Field of Classification Search
USPC ............... 363/78, 79, 95; 323/207, 299, 906; 307/45, 51, 82
See application file for complete search history.

(56) References Cited

U.S. PATENT DOCUMENTS

| 7,158,395 | B2 * | 1/2007 | Deng et al. ..................... 363/95 |
| 7,193,872 | B2 * | 3/2007 | Siri ................................. 363/95 |
| 7,324,361 | B2 * | 1/2008 | Siri ................................. 363/95 |
| 8,228,697 | B2 * | 7/2012 | Wagoner ........................ 363/95 |
| 8,344,550 | B2 * | 1/2013 | Delmerico et al. ............ 307/82 |
| 8,467,200 | B2 * | 6/2013 | Pan et al. .................... 363/21.02 |
| 8,508,202 | B2 * | 8/2013 | Cho ............................. 323/282 |
| 8,670,249 | B2 * | 3/2014 | Khajehoddin et al. .......... 363/39 |
| 2002/0163323 | A1 * | 11/2002 | Kasai et al. ................... 323/284 |
| 2011/0134668 | A1 | 6/2011 | Cho |

FOREIGN PATENT DOCUMENTS

| JP | 08-171430 A | 7/1996 |
| KR | 10-2007-0043746 A | 4/2007 |
| KR | 10-1036098 B1 | 5/2011 |

* cited by examiner

*Primary Examiner* — Adolf Berhane
(74) *Attorney, Agent, or Firm* — Lee & Morse, P.C.

(57) ABSTRACT

An energy storage system (ESS) and a method thereof are disclosed. The system includes a maximum power tracking control unit changing a controlled variable for maximum power point extraction in proportion to an hourly current and power slope of the power generating unit, setting the change amount of the controlled variable to be relatively large if the hourly current and power slope is out of a predetermined hourly current and power slope range, and setting the change amount of the controlled variable to be relatively small if the hourly current and power slope is within a predetermined hourly current and power slope range, and a maximum power extracting unit extracting and converting a maximum power from the power generating unit in response to a control of the maximum power tracking control unit.

20 Claims, 7 Drawing Sheets

ENERGY STORAGE SYSTEM AND METHOD THEREOF

CROSS-REFERENCE TO RELATED APPLICATION

The present application claims priority under 35 U.S.C. §119 to Korean Patent Application No. 10-2012-0133284, filed on Nov. 22, 2012, in the Korean Intellectual Property Office, and entitled: "Maximum Power Point Tracking Converter and Method Thereof," which is incorporated by reference herein in its entirety.

BACKGROUND

1. Field

Embodiments relate to an energy storage system (ESS) and a method thereof.

2. Description of the Related Art

In general, an electrical energy source (for example, an electrochemical battery and generator) has characteristics of a linear voltage source, and thus, always maintains a constant voltage regardless of characteristics of a load. Additionally, since there is only one operating point in such an electrical energy source, it always operates as a stable system under any input and output condition. That is, when an electrical energy source with a linear voltage source is used, desired operating conditions may be obtained regardless of load conditions.

However, as one example, a solar cell or a wind power generator is classified as a representative nonlinear voltage source having completely different electrical characteristics from the above-mentioned electrical energy source. Especially, since voltage and current change in the solar cell according to the weather, its operating point is always changed. Due to such a phenomenon, an unstable state such as excessive ripple and oscillation may occur in a system during power conversion. Accordingly, in order to obtain stable output power at a desired operating point, it is necessary to appropriately adjust an operating point according to a voltage and current of a solar cell.

Thus, a technique for adjusting an operating point of a nonlinear power generating system in order to generate the maximum power amount is referred to as a maximum power point tracking technique. Since the maximum power point tracking technique for allowing an operating point to track the maximum power point has a direct impact on the generation amount of a nonlinear power generating system, it is very important.

SUMMARY

One or more embodiments are directed an energy storage system (ESS) available for prompt and accurate maximum power point tracking by using a power slope in addition to a current slope of a nonlinear power generating system, and a method thereof.

One or more embodiments provide an energy storage system (ESS) available for prompt and accurate maximum power point tracking by making the change amount of a controlled variable relatively large when a current and power slope of a nonlinear power generating system is out of a predetermined range, and a method thereof.

One or more embodiments provide an energy storage system (ESS) available for prompt and accurate maximum power point tracking by making the change amount of a controlled variable relatively small when a current and power slope of a nonlinear power generating system is within a predetermined range, and a method thereof.

One or more embodiments provide an energy storage system (ESS) for tracking and extracting a maximum power from a power generating unit that includes a maximum power tracking control unit changing a controlled variable for maximum power point extraction in proportion to an hourly current and power slope of the power generating unit, setting the change amount of the controlled variable to be relatively large if the hourly current and power slope are is outside a predetermined hourly current and power slope range, and setting the change amount of the controlled variable to be relatively small if the hourly current and power slope is within a predetermined hourly current and power slope range, and a maximum power extracting unit extracting and converting a maximum power from the power generating unit in response to a control of the maximum power tracking control unit.

The predetermined hourly current and power slope range may be ±1% to ±20% on the basis of an hourly current and power slope corresponding to a predetermined maximum power point.

The predetermined hourly current and power slope range may be ±5 to ±10% on the basis of an hourly current and power slope corresponding to a predetermined maximum power point.

The maximum power tracking control unit may include a current and power slope range setting unit setting a hourly current and power slope range that is a criteria for determining the change amount of the controlled variable, a current and power slope comparing unit comparing the hourly current and power slope of the power generating unit with the hourly current and power slope range, and a controlled variable setting unit setting the change amount of the controlled variable to be relatively small when the hourly current and power slope of the power generating unit is within the hourly current and power slope range.

The controlled variable setting unit may set the change amount of the controlled variable to be relatively large when the hourly current and power slope of the power generating unit is out of the hourly current and power slope range.

The maximum power extracting control unit may include a power calculating unit calculating a current power by using an input voltage and an input current provided from the power generating unit, and a power comparing unit comparing the current power provided from the power calculating unit with a pre-stored previous power, wherein the controlled variable setting unit sets the controlled variable by using an output signal provided from the current and power slope comparing unit and the power comparing unit.

A PWM control unit may be electrically connected to the controlled variable setting unit. A gate signal generating unit may be electrically connected to the PWM control unit. The maximum power extracting unit may be controlled by a gate signal of the gate signal generating unit. A controlled variable output from the controlled variable setting unit may be a duty ratio of a pulse signal for a control of the PWM control unit.

The maximum power extracting unit may be a non-insulated DC-DC converter.

The maximum power extracting unit may be an insulated DC-DC converter.

The power generating unit may be a solar cell or a wind power generator.

One or more embodiments provide a method of tracking a maximum power point from a power generating unit that includes sensing an input current and an input voltage provided from the power generating unit; calculating an hourly current and power slope from the input current and a hourly power slope from the input current and the input voltage, determining whether the calculated hourly current and power slope is within a predetermined hourly current and power slope range, setting the change amount of a controlled variable for extracting a maximum power from the power generating unit to be relatively small when the calculated hourly current and power slope is within the predetermined hourly current and power slope range, and setting the change amount of a controlled variable for extracting a maximum power from the power generating unit to be relatively large when the calculated hourly current and power slope is out of the predetermined hourly current and power slope range.

The predetermined hourly current and power slope range may be ±1% to ±20% of an hourly current and power slope corresponding to a predetermined maximum power point.

The predetermined hourly current and power slope range may be ±5 to ±10% of an hourly current and power slope corresponding to a predetermined maximum power point.

After the setting of the change amount of the controlled variable to be relatively large, the method may further include determining whether a currently sensed current value is equal to or greater than a current value corresponding to a predetermined maximum power point, and setting a current controlled variable by adding the change amount of the controlled variable having the set relatively large value to a previous controlled variable when the currently sensed current value is equal to or greater than the current value corresponding to the predetermined maximum power point.

After setting the change amount of the controlled variable to be relatively large, the method may further include determining whether a currently sensed current value is equal to or greater than a current value corresponding to a predetermined maximum power point, and setting a current controlled variable by subtracting the change amount of the controlled variable having the set relatively large value from a previous controlled variable when the currently sensed current value is less than the current value corresponding to the predetermined maximum power point.

After setting the change amount of the controlled variable to be relatively small, the method may further include determining whether a current power is equal to or greater than a previous power, and setting a current controlled variable by adding the change amount of the controlled variable having the set relatively small value to a previous controlled variable when the current power is equal to the previous power and a direction in the change of the controlled variable is equal to or greater than 0.

After setting the change amount of the controlled variable to be relatively small, the method may further include determining whether a current power is equal to or greater than a previous power, and setting a current controlled variable by subtracting the change amount of the controlled variable having the set relatively small value from a previous controlled variable when the current power is equal to or greater than the previous power and a direction in the change of the controlled variable is less than 0.

After setting the change amount of the controlled variable to be relatively small, the method may further include determining whether a current power is equal to or greater than a previous power, and setting a current controlled variable by subtracting the change amount of the controlled variable having the set relatively small value from a previous controlled variable when the current power is less than the previous power and a direction in the change of the controlled variable is equal to or less than 0.

After setting the change amount of the controlled variable to be relatively small, the method may further include determining whether a current power is equal to or greater than a previous power; and setting a current controlled variable by adding the change amount of the controlled variable having the set relatively small value to a previous controlled variable when the current power is less than the previous power and a direction in the change of the controlled variable is greater than 0.

The method may include changing the controlled variable using a previous controlled variable and the change amount.

The method may include extracting and converting a maximum power from the power generating unit using the changed controlled variable.

The power generating unit may be a solar cell or a wind power generator.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain principles of the present disclosure. In the drawings.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the disclosure to those skilled in the art.

Hereinafter, embodiments will be described in detail with reference to the accompanying drawings.

Figure 1:
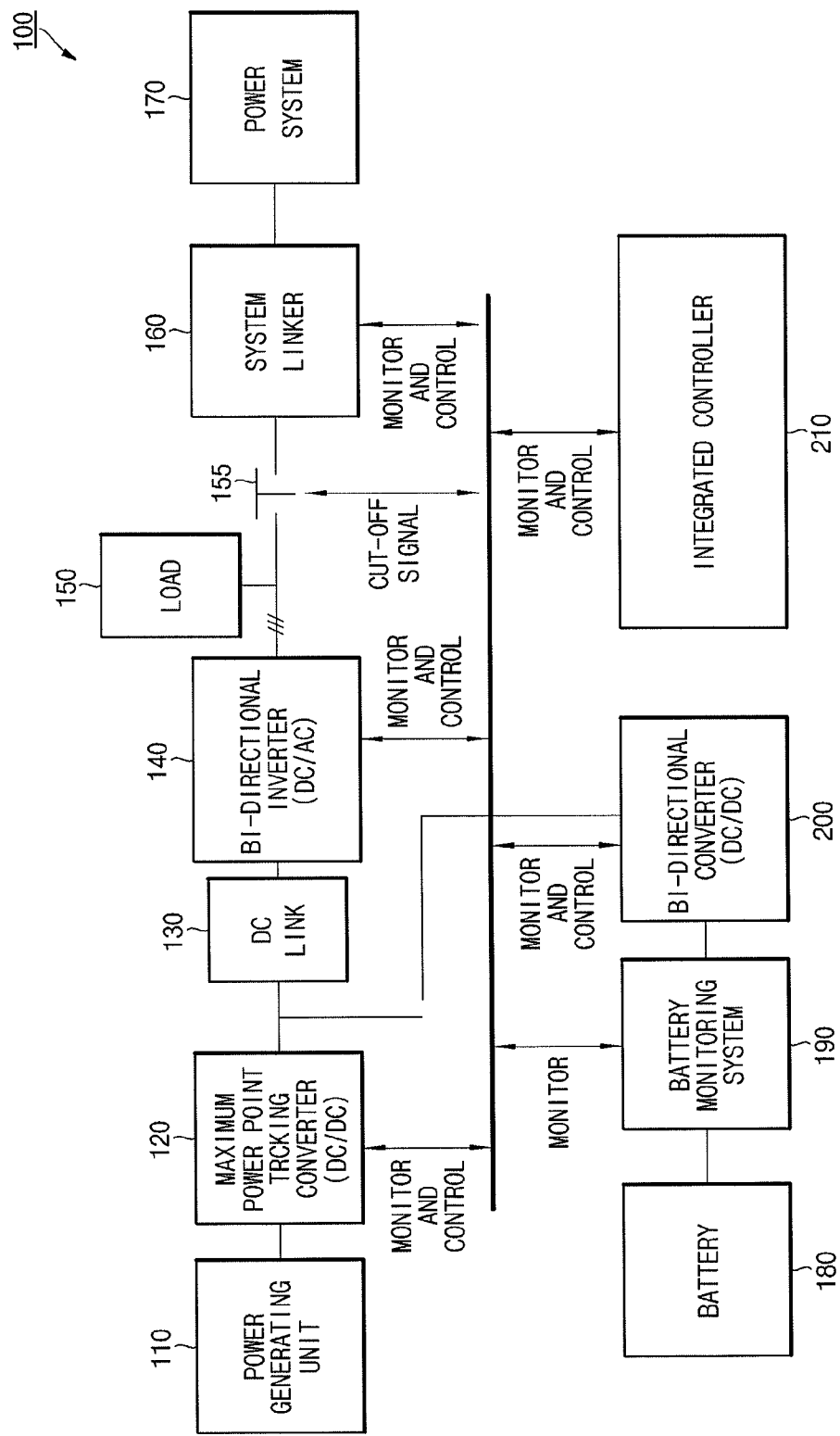
FIG. 1 illustrates a block diagram of a power generating system according to an embodiment.

FIG. 1 illustrates a block diagram of a power generating system according to an embodiment. As shown in FIG. 1, a nonlinear power generating system 100 includes a power generating unit 110, an energy storage system (ESS) 120, a Direct Current (DC) link 130, a bi-directional inverter 140, a load 150, a system linker 160, a electric power system 170, a battery 180, a battery monitoring system 190, a bi-directional converter 200, and an integrated controller 210.

The power generating unit 100 refers to an energy source including the sun, wind, water, geothermal heat, and so forth. In more detail, the power generating unit 110 may be an electrical energy source obtained from the sun, a battery, and a wind power generator and equivalents thereof. A solar cell is exemplarily described as the power generating unit 110, but embodiments are not limited thereto.

The energy storage system (ESS) 120 extracts maximum power from the power generating unit 110, converts the power into another DC power level, and outputs the converted DC power level to the DC link 130. For example, an output of a solar cell changes nonlinearly depending on insolation and surface temperature. Such a phenomenon is a main factor in the deterioration of the power generation efficiency of a solar cell. The energy storage system (ESS) 120 maintains an operating point of a solar cell (which changes nonlinearly depending on insolation and surface temperature) to maintain operation at the maximum power point.

The DC link 130 temporarily stores the DC power provided from the energy storage system (ESS) 120. The DC link 130 may be a large capacitor substantially. Accordingly, the DC link 130 stores stable DC power by removing AC components from the DC power output from the energy storage system (ESS) 120. In addition, the DC link 130 stabilizes and temporarily stores the DC power provided from the bi-directional inverter 140 or the bi-directional converter 200.

The bi-directional inverter 140 converts the DC power provided from the DC link 130 into commercial AC power and outputs the AC power. Additionally, the bi-directional inverter 140 converts the commercial AC power provided from the electric power system 170 into DC power and then provides the DC power to the DC link 130. The power stored in the DC link 130 is provided to the battery 180 through the bi-directional converter 200.

The load 150 may be a home or an industrial facility using commercial AC voltage. The load 150 receives commercial AC power from the power generating unit 110, the battery 180, or the electric power system 170.

The system linker 160 connects the bi-directional inverter 140 and the electric power system 170. For example, the system linker 160 adjusts a voltage varying range, suppresses high harmonic wavelengths, and removes a DC component in order to provide the AC power of the bi-directional inverter 140 to the electric power system 170 or provide the AC power of the electric power system 170 to the bi-directional inverter 140.

The electric power system 170 is an AC power system provided from a power company or a power generating company. For example, the electric power system 170 is an electrical link that includes power plants, substations, and transmission lines over a wide area. The electric power system 170 is typically called a grid.

The battery 180 may be a charging and discharging available secondary battery. For example, the battery 180 may include a lithium ion battery, a lithium polymer battery, and equivalents thereof, but embodiments are not limited thereto.

The battery monitoring system 190 maintains and manages a state of the battery 180 to be optimal. For example, the battery monitoring system 190 monitors the voltage, current, and temperature of the battery 180, and outputs a warning if an abnormality occurs. Furthermore, the battery monitoring system 190 may calculate a State Of Charge (SOC) and a State Of Health (SOH) of the battery 180, may perform cell balancing to allow the voltage or capacity of each battery to be identical, and/or may control a cooling fan (not shown) to prevent the overheating of the battery 180.

The bi-directional converter 200 converts the DC power from the power generating unit 110 into another level of DC power proper for the battery 180. The bi-directional converter 200 also converts the DC power of the battery 180 into another level of DC power appropriate for the DC link 130. The bi-directional converter 200 may be formed as a single structure, and may be a non-isolation type or an isolation type.

The integrated controller 210 monitors and controls the energy storage system (ESS) 120, the bi-directional inverter 140, the system linker 160, and the bi-directional converter 200. Additionally, the integrated controller 210 monitors the battery monitoring system 190 in communication with the bi-directional converter 200. In particular, the integrated controller 210 senses voltage, current, and temperature from the energy storage system (ESS) 120, the bi-directional inverter 140, the system linker 160, and the bi-directional converter 200. The integrated controller 210 thereby controls each of the energy storage system (ESS) 120, the bi-directional inverter 140, the system linker 160, and the bi-directional converter 200. Furthermore, the integrated controller 210 may manipulate a breaker 155 installed between the load 150 and the system linker 160 in case of emergency.

Figure 2:
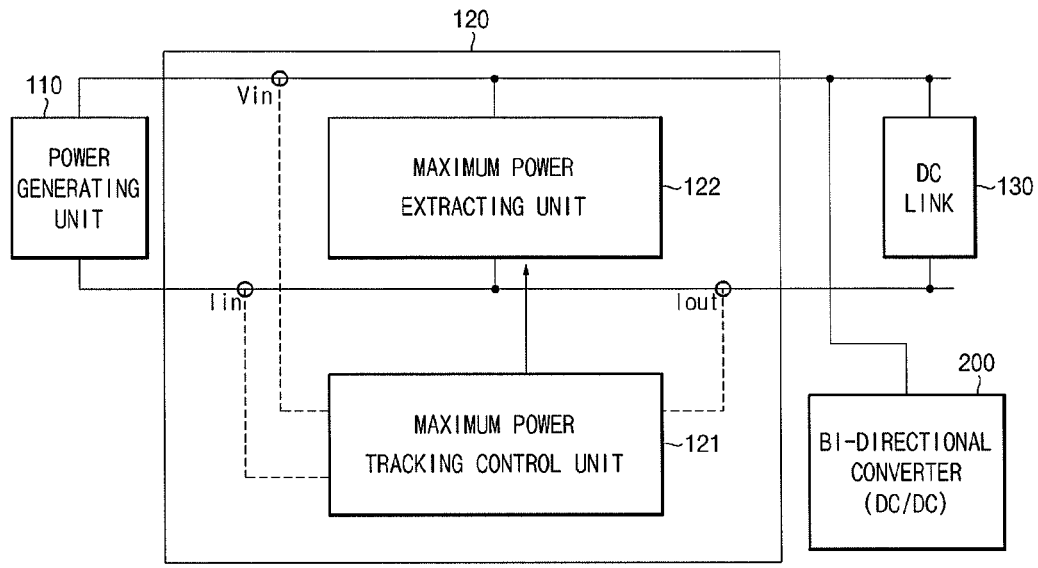
FIG. 2 illustrates a block diagram of an energy storage system (ESS) of a power generating system according to an embodiment.

FIG. 2 illustrates a block diagram of the energy storage system (ESS) 120 of the nonlinear power generating system 100 according to an embodiment. As shown in FIG. 2, the energy storage system (ESS) 120 includes a maximum power tracking control unit 121 and a maximum power extracting unit 122.

As shown in FIG. 2, the energy storage system (ESS) 120 of the power generating system is installed between the power generating unit 110, the DC link 130, and the bi-directional converter 200. The energy storage system (ESS) 120 converts the DC power extracted by tracking the maximum power point of the power generating unit 110 into another level of DC power and then provides the converted DC power to the DC link 130 and the bi-directional converter 200.

The maximum power point tracking control unit 121 senses the voltage and current from the power generating unit 110, and calculates power using the sensed voltage and current. Then, the maximum power point tracking control unit 121 calculates the slope of the current and power, and changes a controlled variable in order to extract the maximum power point in proportion to the slope of the current and power. In particular, the maximum power point tracking control unit 121 sets the change amount of the controlled variable to be relatively large if the slope of the current and power is outside a predetermined slope range of current and power. Additionally, the maximum power point tracking control unit 121 sets the change amount of the controlled variable to be relatively small if the slope of the current and power is within the predetermined slope range of current and power.

More specifically, if the current and power slope from the power generating unit 110 is outside a predetermined current and power slope range, the maximum power point tracking control unit 121 sets the change amount of a controlled variable for the maximum power point extraction to be relatively large, thereby allowing the operating point of the power generating unit 100 to move to near the maximum power point instantly.

Figure 5A:
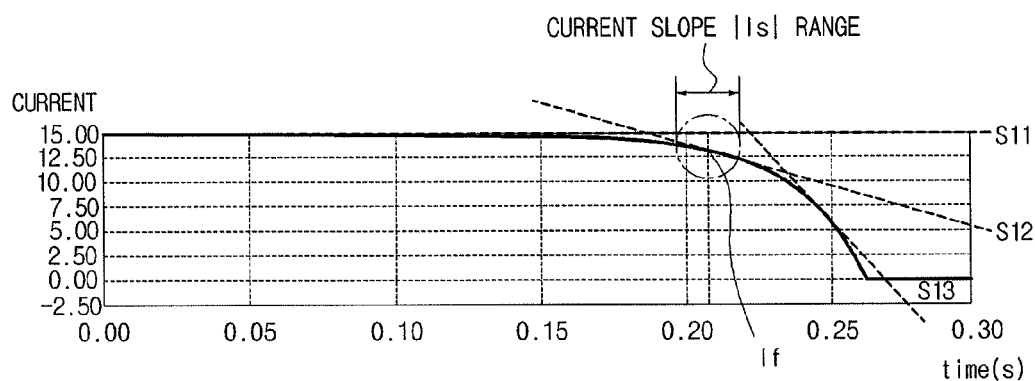
FIGS. 5A to 5C illustrate graphs of the characteristic curves of current, voltage, and power of each solar cell.
Figure 5B:
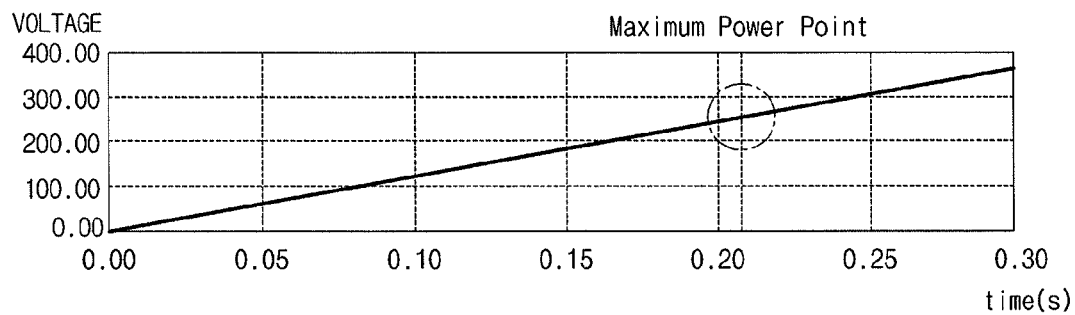

Additionally, if the current and power slope from the power generating unit 110 is within the predetermined current and power slope range, the maximum power point tracking control unit 121 sets the change amount of a controlled variable for the maximum power point extraction to be relatively small, thereby allowing the operating point of the power generating unit 100 to move to the maximum power point accurately. These operations will be described in more detail. Moreover, as shown in FIGS. 5A and 5B, the current and power slope refers to an hourly current slope and an hourly power slope. That is, the current and power slope in this specification should be understood as hourly current and power slopes.

The maximum power extracting unit 122 extracts the maximum power from the power generating unit 110 in response to a control signal of the maximum power tracking control unit 121 and converts DC power into another level of DC power to be supplied to the DC link 130. The maximum power extracting unit 122 may be a non-isolated DC-DC converter, which is simple and inexpensive, or an isolated DC-DC converter, which is safer and expensive, but embodiments are not limited thereto.

Figure 3:
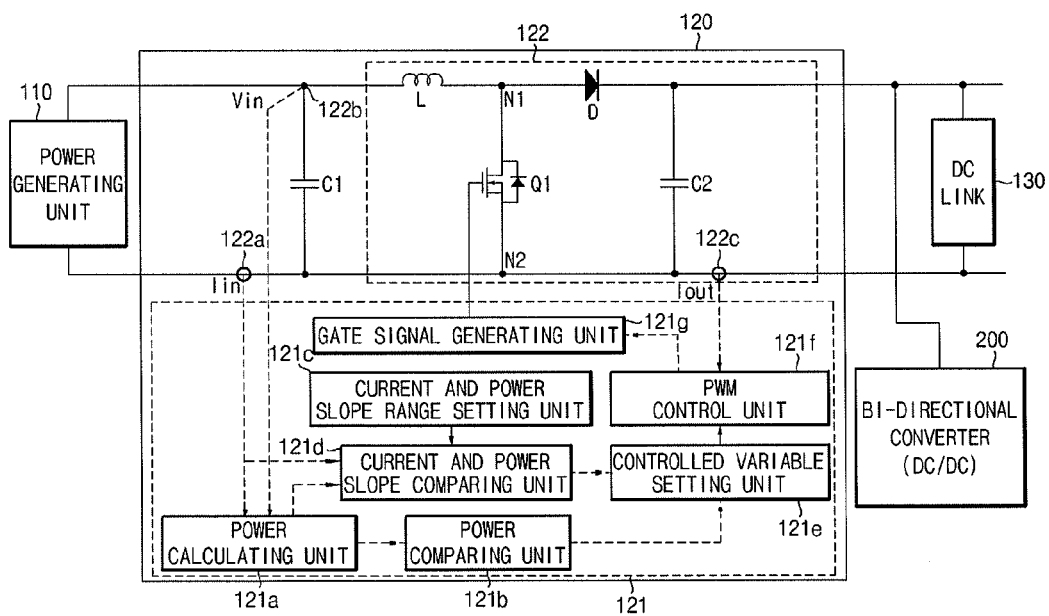
FIG. 3 illustrates a circuit diagram of the energy storage system (ESS) of FIG. 2 according to an embodiment.

FIG. 3 illustrates a circuit diagram of the energy storage system (ESS) 120 of FIG. 2.

As shown in FIG. 3, the maximum power tracking control unit 121 includes a power calculating unit 121a, a power comparing unit 121b, a current and power slope range setting unit 121c, a current and power slope comparing unit 121d, a controlled variable setting unit 121e, a pulse-width modulation (PWM) control unit 121f, and a gate signal generating unit 121g. The maximum power tracking control unit 121 may further include additional components, such that only those components needed to convey the operation of the present embodiment are shown.

The power calculating unit 121a receives a current value from the power generating unit 110 through a current sensor 122a and receives a voltage value from the power generating unit 110 through a voltage sensor 122b. The power calculating unit 121a multiplies the current value and the voltage value to calculate a power value. Hereinafter, in some cases, a current value, a voltage value, and a power value may be abbreviated to a current, a voltage, and a power. The power value is output from the power calculating unit 121a to the power comparing unit 121b and to the current and power slope comparing unit 121d.

The power comparing unit 121b stores a previous power and calculates a difference between the previous power and a current power.

The current and power slope range setting unit 121c sets and stores a current slope and a power slope range of ±1% to ±20%, e.g., ±5% to ±10%, on the basis of a current slope and a power slope corresponding to a predetermined maximum power point. Accordingly, the current and power slope ranges may vary according to a device environment. The current and power slope range setting unit 121c outputs the current and power slope ranges to the current and power slope comparing unit 121d.

The current and power slope comparing unit 121d calculates the hourly current slope using current values from the current sensor 122a and calculates the hourly power slope using power values from the power calculating unit 121a. The current and power slope comparing unit 121d determines whether the calculated current and power slopes are within a current slope range and a power slope range stored in the current and power slope range setting unit 121c. For example, the current and power slope comparing unit 121d compares whether the calculated current and power slopes are within current and power slope ranges of ±1% to ±20%, e.g., ±5% to ±10%, on the basis of current and power slopes corresponding to a predetermined maximum power point.

The current and power slope comparing unit 121d may include separate current slope and power slope comparing units. Accordingly, a current slope range setting unit of the current and power slope range setting unit 121c may provide a predetermined current slope range to a current slope comparing unit, and a power slope range setting unit of current and power slope range setting unit 121c may provide a predetermined power slope range to a power slope comparing unit. A value output from a current slope comparing unit and a value output from a power slope comparing unit may be calculated as an average value, and then, may be output to the controlled variable setting unit 121e.

The current and power slope comparing unit 121d may receive a current slope and a power slope, separately, and by averaging them, may obtain an average slope. Of course, the current and power slope range stored in the current and power slope range setting unit 121c may also be an average range of a current and power slope range.

The current and power slope comparing unit 121d may multiply a current slope and a power slope by different weighted values, and then average the values obtained by multiplying the weighted values in order to obtain an average slope. Relative to the current and power slope range stored in the current and power slope range setting unit 121c, an average slope range may be obtained by multiplying a current slope range and a power slope range by different weighted values and averaging the values obtained by multiplying the weighted values. Accordingly, a weighted value applied average slope is compared to a weighted value applied average slope range. As one example, if power influences maximum power tracking more than current, the power is multiplied by a larger weighted value than the current, while if current influences maximum power tracking more than power, the current is multiplied by a larger weighted value than the power. Even when one of the above methods is used, only one value is input to the controlled variable setting unit 121e.

The controlled variable setting unit 121e sets a controlled variable to be provided to the PWM control unit 121f using the signals provided from the power comparing unit 121b and the current and power slope comparing unit 121d. When current and power slopes are outside a predetermined range, the controlled variable setting unit 121e determines that the operating point of the power generating unit 110 is far from the maximum power point. Thus, the controlled variable setting unit 121e selects a relatively large controlled variable to be output to the PWM control unit 121f. When current and power slopes are within a predetermined range, the controlled variable setting unit 121e determines that the operating point of the power generating unit 110 is close to the maximum power point. Thus, the controlled variable setting unit 121e selects a relatively small controlled variable to be output to the PWM control unit 121f.

The PWM control unit 121f provides the PWM signal, which is determined by the controlled variable from the controlled variable setting unit 121e, to the gate signal generating unit 121g. The controlled variable provided from the controlled variable setting unit 121e may be the duty ratio of a pulse signal for PWM control. That is, the controlled variable may be a ratio of the amplitude of an output sinusoidal signal to the amplitude of an input carrier signal. The PWM control unit 121f is feedback-controlled by an output current Iout from the output current sensor 122c.

The gate signal generating unit 121g provides a gate signal of a predetermined frequency to the gate of a switching transistor Q1 in the maximum power extracting unit 122.

The maximum power extracting unit 122 may be an inexpensive non-isolated DC-DC converter. For example, the maximum power extracting unit 122 may include a first capacitor C1, an inductor L, a diode D, a second capacitor C2, and a switching transistor Q1. The first capacitor C1 is connected in parallel to the anode and the cathode of the power generating unit 110 and has the same potential difference as the voltage of the power generating unit 110. The inductor L is connected in series to the first capacitor C1. The second capacitor C2 is connected in parallel to the power generating unit 110 to remove an AC component. The switching transistor Q1 has a drain connected to a node N1 between the inductor L and the diode D, a source connected to the node N2 between the first capacitor C1 and the second capacitor C2, and a gate connected to the gate signal generating unit 121g. Of course, those skilled in the art will understand additional components may be further included in order to improve maximum power extraction efficiency.

By this configuration, the switching transistor Q1 of the maximum power extracting unit 122 is turned on/off with a predetermined frequency by the maximum power tracking control unit 121, i.e. the gate signal of the gate signal generating unit 121g. Accordingly, the energy of the power generating unit 110 is converted into another level of DC power through the inductor L, the diode D, and the second capacitor C2, and the converted DC power is delivered to the DC link 130 and the bi-directional converter 200.

Figure 4:
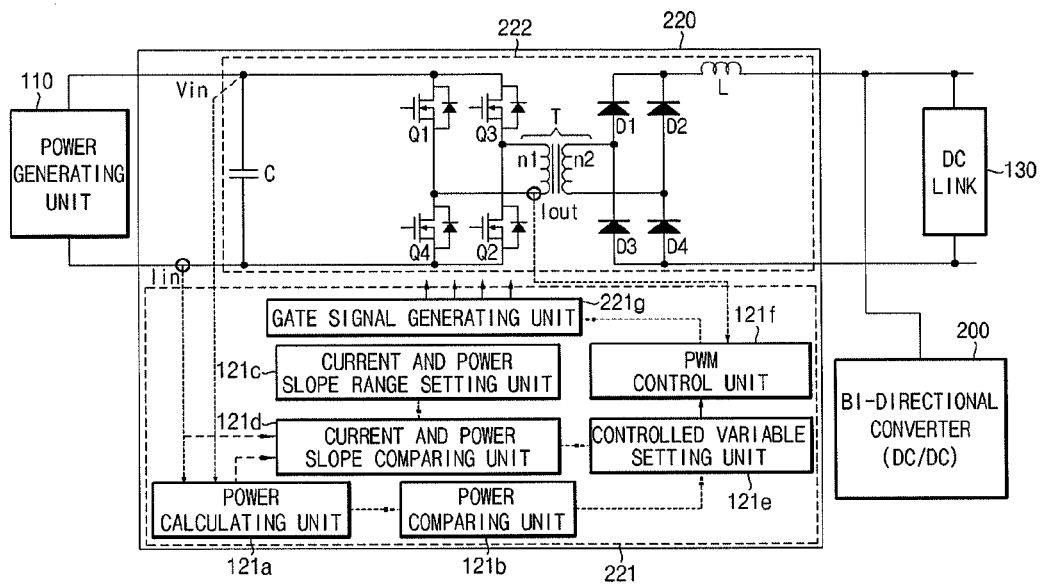
FIG. 4 illustrates a circuit diagram of another embodiment of the energy storage system (ESS) of FIG. 2.

FIG. 4 illustrates a circuit diagram of another example 220 of the energy storage system (ESS) of FIG. 2. In particular, the energy storage system (ESS) 220 may include a maximum power tracking control unit 221 and a maximum power extracting unit 222 configured as an isolated DC-DC converter. Other than providing four gate signals to the maximum power extracting unit 222, the maximum power tracking control unit 221 has a same configuration and operation as the maximum power tracking control unit 121 of FIG. 3, and a description thereof will not be repeated.

As shown in FIG. 4, the maximum power extracting unit 222 includes a capacitor C (connected in parallel to the anode and cathode of the power generating unit 110 and having the same potential difference as the voltage of the power generating unit 110), four switching transistors Q1, Q2, Q3, and Q4 (connected in parallel to the capacitor C and turned on/off with a predetermined frequency), four diodes D1, D2, D3, and D4 (connected in parallel to the capacitor C and rectifying electric waves), a transformer T (having a first winding n1 connected to the switching transistors Q1, Q2, Q3, and Q4, and a second winding n2 connected to the four diodes D1, D2, D3, and D4), and an inductor L connected in series to the diodes D1, D2, D3, and D4. Of course, those skilled in the art will understand additional components may be further included in order to improve maximum power extraction efficiency.

By this configuration, the switching transistors Q1, Q2, Q3, and Q4 of the maximum power extracting unit 222 are turned on/off with a predetermined frequency by the maximum power tracking control unit 221, i.e. the gate signals of the gate signal generating unit 221g. Accordingly, the energy of the power generating unit 110 is converted into another level of DC power through the diode D and the inductor L, and the converted DC power is again delivered to the DC link 130 and the bi-directional converter 200.

Figure 5C:
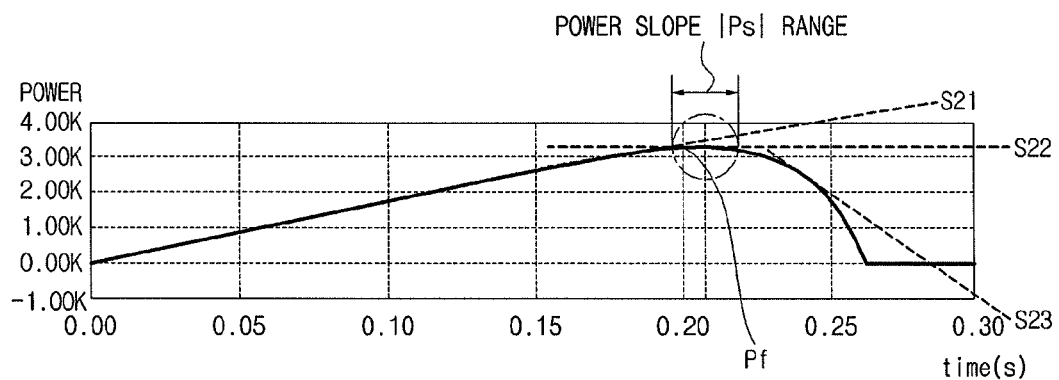

FIGS. 5A to 5C illustrate graphs of the characteristic curves of current, voltage, and power of each solar cell.

As shown in FIG. 5A, an X axis represents a time (s) and a Y axis represents a current (A) output from a solar cell. During operation of the solar cell, a predetermined current, e.g., about 15A, is output at the beginning. As time elapses, an output current is gradually reduced. For example, after about 0.15 sec elapses, the output current of the solar cell begins to decrease and, after about 0.27 sec elapses, the output current of the solar cell becomes about 0 A.

In FIG. 5A, If represents a current corresponding to the maximum power point, a current slope range |Is| is determined in accordance with the maximum power point, and S11, S12, and S13 represent current slopes. The current slope S11 is outside, i.e., shallower than, the current slope |Is| range, and an operating point having the current slope S11 is to the left of the maximum power point If. The current slope S12 is within the current slope |Is| range and an operating point having the current slope S12 is at the maximum power point If. The current slope S13 is outside, i.e., steeper than, the current slope |Is| range and an operating point having the current slope S13 is to the right of the maximum power point If.

As shown in FIG. 5B, an X axis represents a time (s) and a Y axis represents a voltage (V) output from a solar cell. Once a solar cell operates, an output voltage is gradually increases as time elapses. For example, as illustrated in FIG. 5B, during operation of the solar cell, an initial output voltage is 0 V, after about 0.21 sec elapses, an output voltage becomes about 250 V, and, after 0.21 sec elapses, an output voltage continuously increases.

As shown in FIG. 5C, an X axis represents a time (s) and a Y axis represents a power (Kwh), i.e., current times voltage. During operation of a solar cell, power gradually increases as time elapses and, after the maximum power point, the power decreases. That is, as illustrated in FIG. 5C, during operation of the solar cell, an initial output voltage is 0 Kwh, after about 0.21 sec elapses, an output power becomes about 3100 Kwh. Additionally, after 0.21 sec elapses, an output power is gradually decreased.

In FIG. 5C, Pf represents a power corresponding to the maximum power point, the power slope range |Ps| is determined in accordance with the maximum power point, S21, S22, and S23 represent a power slope. The power slope S21 is outside, i.e., shallower, than the power slope |Ps| range and an operating point having the power slope S21 is to the left of the maximum power point Pf. The power slope S22 is within the power slope |Ps| range and an operating point having the power slope S22 is the maximum power point Pf. The power slope S23 outside, i.e., steeper than, the power slope |Ps| range and an operating point having the power slope S23 is to the right of the maximum power point Pf.

According to the characteristics of the solar cell, the operating point of the solar cell needs to correspond to the maximum power point. In particular, the maximum power may not be extracted when the solar cell operates outside a predetermined current and power slope range.

Accordingly, according to embodiments, a current slope range and power slope range corresponding to the maximum power point are set in advance. That is, current and power slope ranges maybe set to ±1% to ±20%, e.g., ±5% to ±10%, within current and power slopes corresponding to the predetermined maximum power point. As noted above, the current value corresponding to the maximum power point is referred to as If and a power value corresponding to the maximum power point is referred to as Pf.

As mentioned above, if a current and power slope is outside a predetermined current and power slope |Is| range (for example, outside an interval of 0.19 sec to 0.22 sec at the X-axis in FIGS. 5A to 5C, i.e., a section near the power slopes S12 and S22), embodiments set the change amount of a controlled variable for maximum power point extraction to be relatively large, in order to allow the operating point of a power generating unit to reach near the maximum power point quickly.

Additionally, as mentioned above, if a current and power slope is within a predetermined current and power slope |Is| range (for example, an interval of 0.19 sec to 0.22 sec at the X-axis in FIGS. 5A to 5C, i.e., a section near the power slopes S12 and S22), embodiments set the change amount of a controlled variable for maximum power point extraction to be relatively small, in order to allow the operating point of a power generating unit to match the maximum power point accurately.

Figure 6A:
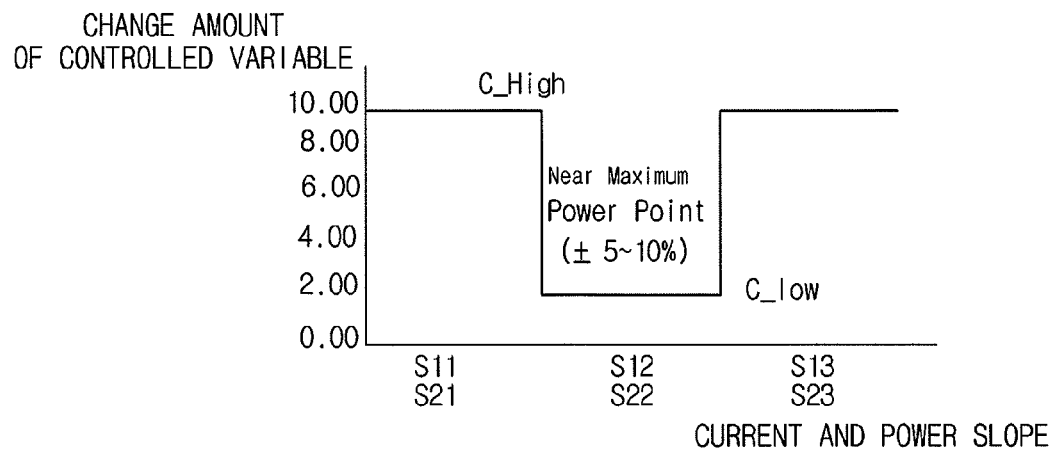
FIGS. 6A to 6C illustrate graphs of the change amount of a controlled variable depending on a current and power slope according to embodiments.
Figure 6B:
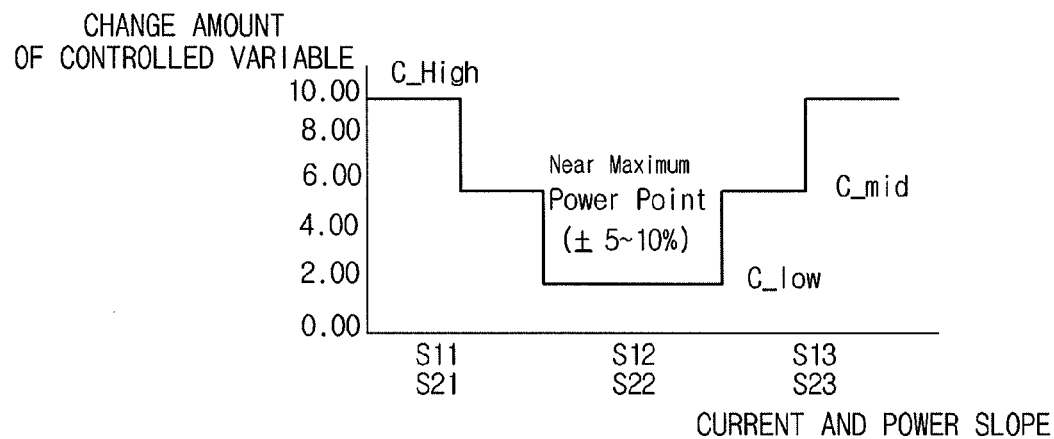
Figure 6C:
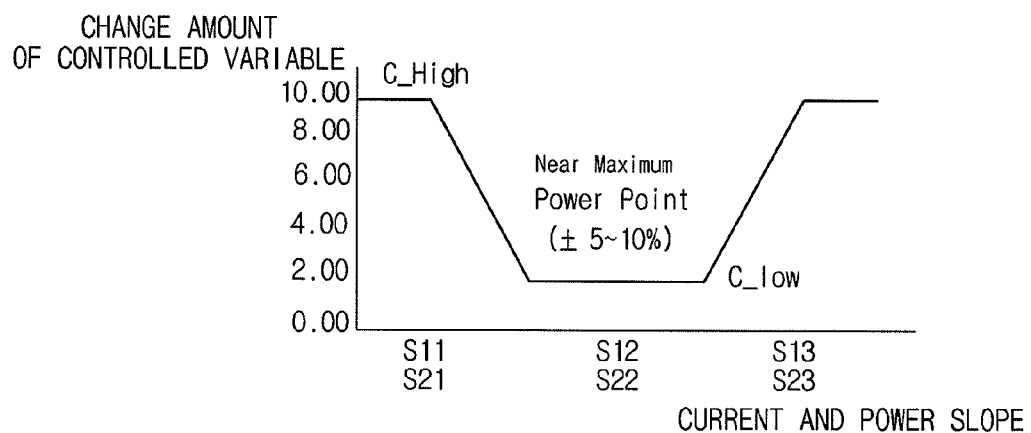

FIGS. 6A to 6C illustrate graphs of the change amount of a controlled variable depending on a current and power slope according to embodiments. In FIGS. 6A to 6C, an X-axis represents current and power slopes and a Y-axis represents a value of a controlled variable. Herein, values of the change amount (i.e. 0 to 10) are just one example used to facilitate understanding, but embodiments are not limited thereto.

As shown in FIG. 6A, a change amount may be set to one of two values. For example, if a current slope and a power slope are within the range of S11 and S21, or S13 and S23, respectively, a relatively high change amount C_high is selected (for example, 10) and, if a current and power slope is within the range of S12 and S22, respectively, a relatively low change amount C_Low is selected (for example, 2). For example, the relatively low change amount C_Low may be selected when the current and power slopes are within a range of about ±5% to about ±10% relative to the current and power slopes of the maximum power point.

As shown in FIG. 6B, a change amount may be set to different values in stepwise fashion. For example, if current and power slopes area within the range of S11 and S21, or S13 and S23, respectively, the relatively high controlled variable C_high is selected (for example, 10). If current and power slopes are within a range of S11 and S21 to S12 and S22 or within a range of S12 and S22 to S13 and S23, a relatively intermediate change amount C_mid is selected (for example, 6). If the current and power slopes are within the range of S12 and S22, the relatively low change amount C_Low is selected (for example, 2). The lowest change amount C_Low is selected from near the maximum power point. For example, the relatively low change amount C_Low may be selected within a range of about ±5% to about ±10% on the basis of the current and power slope of the maximum power point.

As shown in FIG. 6C, a change amount may be set to different values in a continuous, e.g., sloped, fashion. For example, when current and power slopes are within the range of S12 and S22, the relatively low change amount C_Low is selected (for example, 2). As a current and power slope approach S11 and S21 or S13 and S23, i.e., outside the range of S12 and S22, the greater the change amount selected. When current and power slopes are within the range of S11 and S21 or S13 and S23, the relatively high change amount C_High is selected (for example, 10).

Figure 7:
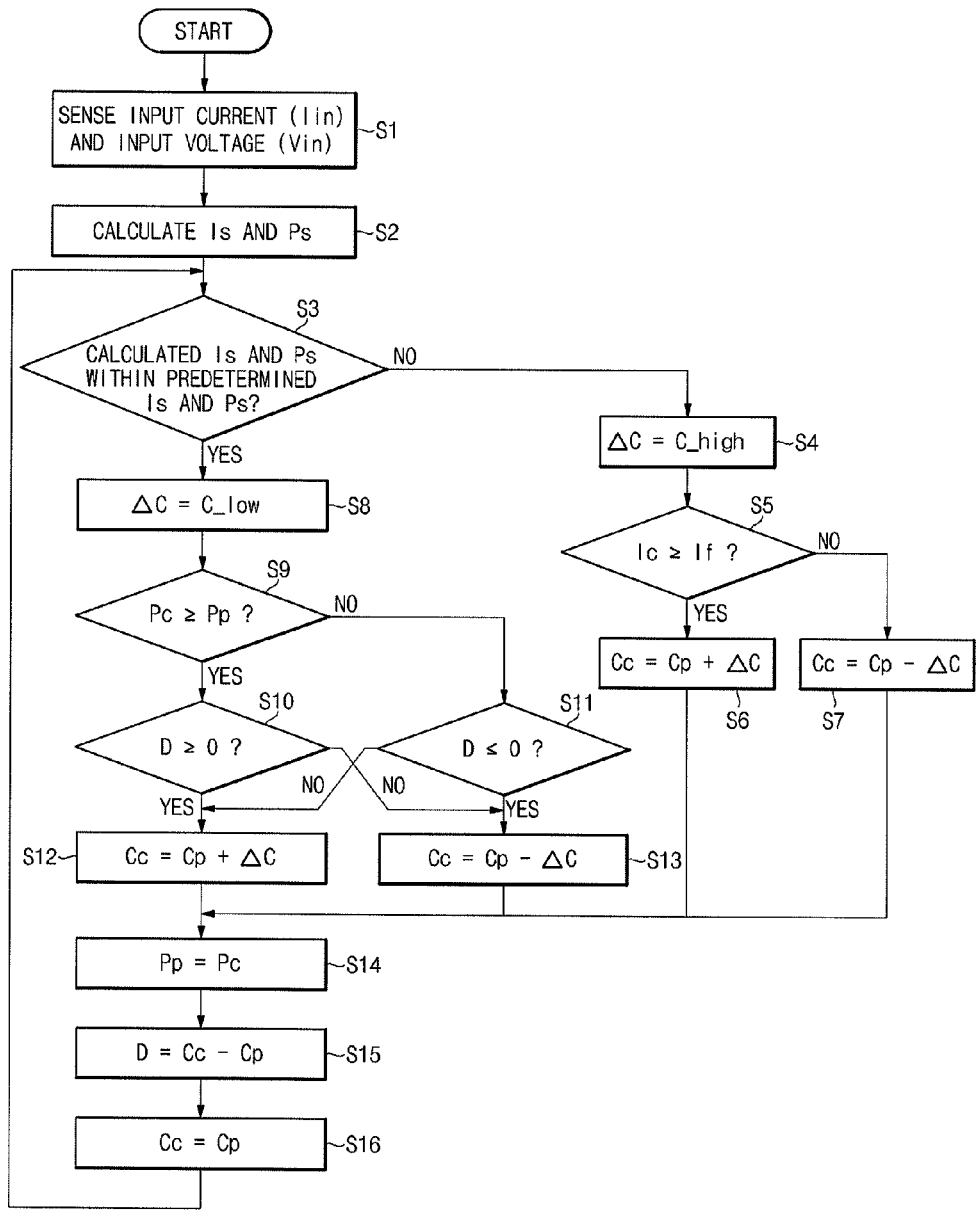
FIG. 7 illustrates a flowchart of a method of tracking a maximum power point according to an embodiment.

FIG. 7 illustrates a flowchart of a method of tracking a maximum power point according to an embodiment.

As shown in FIG. 7, the maximum power point tracking method of a non-linear power generating system includes sensing current and voltage in operation S1, calculating a current and power slope in operation S2, and determining the range of the calculated current and power slopes in operation S3.

Here, a current and power slope refers to an average slope of two values, and also a current and power slope range refers to an average slope range of two values. Furthermore, as mentioned above, a weighted value may be assigned to one of current and power.

The sensing of the current and voltage in operation S1 includes sensing an input current Iin and an input voltage Vin supplied from the power generating unit 110, by using the current sensor 122a and the voltage sensor 122b.

During the calculating of the current and power slope in operation S2, for example, the current and power slope comparing unit 121d calculates a current slope Is by using the current sensed by the current sensor 122a and calculates a power slope Ps by using the power from the power calculating unit 121a. However, embodiments are not limited thereto. That is, an additional current and power slope calculating unit may be further equipped.

The determining of the calculated current power slope range in operation S3 includes determining whether the calculated current and power slopes Is and Ps are within the predetermined current and power slopes Is and Ps ranges.

Here, the predetermined current and power slopes Is and Ps ranges may be ±1% to ±20%, 5% to ±10%, of a current and power slope corresponding to the predetermined maximum power point. These ranges allow the fastest and most accurate realization of the maximum power point. In particular, when the current and power slopes Is and Ps ranges are set to be less than ±1% or ±5%, the energy storage system (ESS) may not find the maximum power point. That is, since the operating point moves with the relatively large change amount of a controlled variable, for example, in FIGS. 5A to 5C, the operating point may move from the left to the right, or from the right to the left infinitely on the basis of the maximum power point. Additionally, when the current and power slopes Is and Ps ranges are greater than ±10% or ±20%, it takes too much time for the energy storage system (ESS) to find the maximum power point. That is, since the operating point moves from the distance that is too far away from the maximum power point with the relatively small change amount of the controlled variable, for example, in FIGS. 5A to 5C, it takes too much time for the operating point to reach the maximum power point.

When the calculated current and power slope are outside the predetermined current and power slope range, the selecting of the relatively high change amount of the controlled variable is performed in operation S4. That is, the change amount of the controlled variable ΔC is determined as C_high.

The comparing of the current at the maximum power point with the current at present in operation S5 includes comparing a current If at the predetermined maximum power point with a current Ic sensed at the present.

If the current Ic sensed at the present is equal to or greater than the current If at the predetermined maximum power point on the basis of the comparison result, the increasing of the current change amount is performed in operation S6 by using the relatively high control amount of the controlled variable. That is, the current controlled variable Cc is set by adding the change amount of the controlled variable ΔC to the previous controlled variable Cp.

In contrast, if the current Ic sensed at the present is less than the current If at the predetermined maximum power point on the basis of the comparison result, the decreasing of the current change amount is performed in operation S7 by using the relatively high control amount of the controlled variable. That is, the current controlled variable Cc is set by subtracting the change amount of the controlled variable ΔC from the previous controlled variable Cp.

When the calculated current and power slopes Is and Ps are within the predetermined current and power slopes Is and Ps ranges, operation S8 is performed. For example, if the calculated current and power slopes Is and Ps are within ±1% to ±20%, e.g., ±5% to ±10%, of the current and power slope corresponding to the predetermined maximum power point, selecting the relatively low change amount is performed in operation S8. That is, the change amount of the controlled variable ΔC is determined as C_Low.

Then, comparing the current power Pc with the previous power Pp is performed in operation S9. That is, the power calculating unit 121a calculates a current power Pc by using the information sensed by the current sensor 122a and the voltage sensor 122b. Additionally, the power comparing unit 121b storing the value of a previous power Pp compares the current power Pc with the previous power Pp.

When it is determined that the current power Pc is greater than the previous power Pp on the basis of the comparison result, the determining of the direction D of the change of the controlled variable is performed in operation S10. The direction D of the change of the controlled variable may also be previously stored in the power comparing unit 121b. That is, the previous power Pp and the direction D in the change of the controlled variable may be stored in an additional memory.

If the pre-stored direction D in the change of the controlled variable is equal to or greater than 0, the calculating of the current controlled variable is performed in operation S12 by adding the relatively small change amount of the controlled variable to the previous control variable. That is, the current controlled variable Cc is set by adding the change amount of the controlled variable ΔC to the previous controlled variable Cp. Here, as mentioned above, the change amount of the controlled variable ΔC is determined as C_Low.

On the contrary, if the pre-stored direction D in the change of the controlled variable is less than 0, the calculating of the current controlled variable is performed in operation S13 by subtracting the relatively small change amount of the controlled variable from the previous control variable. That is, the current controlled variable Cc is set by subtracting the change amount of the controlled variable ΔC from the previous controlled variable Cp. Likewise, as mentioned above, the change amount of the controlled variable ΔC is determined as C_Low.

Moreover, when it is determined that the current power Pc is less than the previous power Pp on the basis of the comparison result, the determining of the direction D in the change of the controlled variable is performed in operation S11 in the same manner.

If the pre-stored direction D in the change of the controlled variable is equal to or less than 0, the calculating of the current controlled variable is performed in operation S13 by subtracting the relatively small change amount of the controlled variable from the previous control variable. That is, the current controlled variable Cc is set by subtracting the change amount of the controlled variable ΔC from the previous controlled variable Cp. Here, as mentioned above, the change amount of the controlled variable ΔC is determined as C_Low.

On the contrary, if the pre-stored direction D in the change of the controlled variable is greater than 0, the calculating of the current controlled variable is performed in operation S12 by adding the relatively small change amount of the controlled variable to the previous control variable. That is, the current controlled variable Cc is set by adding the change amount of the controlled variable ΔC to the previous controlled variable Cp. Here, as mentioned above, the change amount of the controlled variable ΔC is determined as C_Low.

Then, the current power Pc replaces the previous power Pp and then is stored in operation S14. Then, the direction D in the change of the controlled variable is determined and stored by subtracting the previous controlled variable Cp from the current control variable Cc in operation S15. Lastly, the current control variable Cc is determined as the previous control various Cp and then is stored in operation S16. Here, as mentioned above, a power, a change direction of a controlled variable, and a controlled variable may be stored in an additional memory.

Additionally, according to embodiments, as illustrated in FIG. 7, the change amount of a controlled variable is classified into two values, e.g., a relatively large value C_high and a relatively small value C_Low, as shown in FIG. 6A, but embodiments are not limited thereto. For example, according to embodiments, the change amount of a controlled variable may be changed in a stepwise manner to track the maximum power point as shown in FIG. 6B, or in a continuous manner, e.g. into a slope form outside the range, in order to track the maximum power point as shown in FIG. 6C.

A energy storage system (ESS) and a method thereof provides prompt and accurate maximum power point tracking by using a power slope in addition to a current slope of a nonlinear power generating system.

A energy storage system (ESS) and a method thereof provide prompt and accurate maximum power point tracking by making the change amount of a controlled variable relatively large when a current and power slope of a nonlinear power generating system is out of a predetermined range.

A energy storage system (ESS) and a method thereof provide prompt and accurate maximum power point tracking by making the change amount of a controlled variable relatively small when a current and power slope of a nonlinear power generating system is within a predetermined range.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An energy storage system (ESS) for tracking and extracting a maximum power from a power generating unit, the system comprising:
   a maximum power tracking control unit changing a controlled variable for maximum power point extraction in proportion to an hourly current and power slope of the power generating unit, setting a change amount of the controlled variable to be relatively large if the hourly current and power slope is outside a predetermined hourly current and power slope range, and setting the change amount of the controlled variable to be relatively small if the hourly current and power slope is within the predetermined hourly current and power slope range; and
   a maximum power extracting unit extracting and converting a maximum power from the power generating unit using the controlled variable changed by the maximum power tracking control unit.

2. The system as claimed in claim 1, wherein the predetermined hourly current and power slope range is ±1% to ±20% on the basis of an hourly current and power slope corresponding to a predetermined maximum power point.

3. The system as claimed in claim 1, wherein the predetermined hourly current and power slope range is ±5 to ±10% on the basis of an hourly current and power slope corresponding to a predetermined maximum power point.

4. The system as claimed in claim 1, wherein the maximum power tracking control unit comprises:
   a current and power slope range setting unit setting an hourly current and power slope range;
   a current and power slope comparing unit comparing the hourly current and power slope of the power generating unit with the hourly current and power slope range; and a controlled variable setting unit setting the change amount of the controlled variable in accordance with an output of the comparing unit.

5. The system as claimed in claim 4, wherein:
the controlled variable setting unit sets the change amount of the controlled variable to be relatively small when the hourly current and power slope of the power generating unit is within the hourly current and power slope range; and
the controlled variable setting unit sets the change amount of the controlled variable to be relatively large when the hourly current and power slope of the power generating unit is outside the hourly current and power slope range.

6. The system as claimed in claim 4, wherein the maximum power extracting control unit comprises:
a power calculating unit calculating a current power using an input voltage and an input current provided from the power generating unit; and
a power comparing unit comparing the current power provided from the power calculating unit with a stored previous power,
wherein the controlled variable setting unit sets the controlled variable using an output signal provided from the current and power slope comparing unit and the power comparing unit.

7. The system as claimed in claim 4, further comprising:
a PWM control unit electrically connected to the controlled variable setting unit; and
a gate signal generating unit electrically connected to the PWM control unit, wherein
the maximum power extracting unit is controlled by a gate signal of the gate signal generating unit, and
a controlled variable output from the controlled variable setting unit is a duty ratio of a pulse signal for a control of the PWM control unit.

8. The system as claimed in claim 1, wherein the maximum power extracting unit is a non-isolated DC-DC converter.

9. The system as claimed in claim 1, wherein the maximum power extracting unit is an isolated DC-DC converter.

10. The system as claimed in claim 1, wherein the power generating unit is a solar cell or a wind power generator.

11. A method of tracking a maximum power point from a power generating unit, the method comprising:
sensing an input current and an input voltage provided from the power generating unit;
calculating an hourly current and power slope from the input current and the input voltage;
determining whether the calculated hourly current and power slope is within a predetermined hourly current and power slope range;
setting a change amount of a controlled variable for extracting a maximum power from the power generating unit to be relatively small when the calculated hourly current and power slope is within the predetermined hourly current and power slope range; and
setting the change amount of the controlled variable for extracting a maximum power from the power generating unit to be relatively large when the calculated hourly current and power slope is outside the predetermined hourly current and power slope range.

12. The method as claimed in claim 11, wherein the predetermined hourly current and power slope range is ±1% to ±20% of an hourly current and power slope corresponding to a predetermined maximum power point.

13. The method as claimed in claim 11, wherein the predetermined hourly current and power slope range is ±5 to ±10% of an hourly current and power slope corresponding to a predetermined maximum power point.

14. The method as claimed in claim 11, after setting the change amount of the controlled variable to be relatively large, the method further comprises:
comparing a currently sensed current value to a current value corresponding to a predetermined maximum power point; and
setting a current controlled variable using the change amount of the controlled variable, a previous controlled variable, and a result of comparing.

15. The method as claimed in claim 14, wherein setting the current controlled variable includes:
adding the change amount of the controlled variable to the previous controlled variable when the currently sensed current value is equal to or greater than the current value corresponding to the predetermined maximum power point; and
subtracting the change amount of the controlled variable from the previous controlled variable when the currently sensed current value is less than the current value corresponding to the predetermined maximum power point.

16. The method as claimed in claim 11, after the setting of the change amount of the controlled variable to be relatively small, further comprising:
comparing a currently power to a previous power;
determining a direction in the change of the controlled variable; and
setting a current controlled variable using the change amount of the controlled variable, a previous controlled variable, the direction in the change, and a result of comparing.

17. The method as claimed in claim 16, wherein setting the current controlled variable includes:
adding the change amount of the controlled variable to the previous controlled variable when the current power is equal to the previous power and the direction in the change is equal to or greater than 0;
subtracting the change amount of the controlled variable to the previous controlled variable when the current power is equal to or greater than the previous power and a direction in the change of the controlled variable is less than 0;
subtracting the change amount of the controlled variable from the previous controlled variable when the current power is less than the previous power and a direction in the change is equal to or less than 0; and
adding the change amount of the controlled variable to the previous controlled variable when the current power is less than the previous power and the direction in the change is greater than 0.

18. The method as claimed in claim 11, further comprising changing the controlled variable using a previous controlled variable and the change amount.

19. The method as claimed in claim 18, further comprising extracting and converting a maximum power from the power generating unit using the changed controlled variable.

20. The method as claimed in claim 11, wherein the power generating unit is a solar cell or a wind power generator.

* * * * *